United States Patent
Zavesky et al.

(10) Patent No.: US 11,995,518 B2
(45) Date of Patent: May 28, 2024

(54) MACHINE LEARNING MODEL UNDERSTANDING AS-A-SERVICE

(71) Applicant: AT&T Intellectual Property I, L.P., Atlanta, GA (US)

(72) Inventors: Eric Zavesky, Austin, TX (US); David Crawford Gibbon, Lincroft, NJ (US); Lee Begeja, Gillette, NJ (US); Paul Triantafyllou, Watchung, NJ (US); Behzad Shahraray, Holmdel, NJ (US)

(73) Assignee: AT&T Intellect al P Property I, L.P., Atlanta, GA (US)

( * ) Notice: Subject to any disclaimer, the term of this patent is extended or adjusted under 35 U.S.C. 154(b) by 1391 days.

(21) Appl. No.: 15/849,115

(22) Filed: Dec. 20, 2017

(65) Prior Publication Data

US 2019/0188605 A1 Jun. 20, 2019

(51) Int. Cl.
*G06N 20/00* (2019.01)

(52) U.S. Cl.
CPC .................................... *G06N 20/00* (2019.01)

(58) Field of Classification Search
CPC ........................................................ G06N 20/00
USPC ........................................................ 706/12, 14
See application file for complete search history.

(56) References Cited

U.S. PATENT DOCUMENTS

| | | | |
|---|---|---|---|
| 9,128,792 B2 | 9/2015 | Kimmet et al. | |
| 10,970,183 B1* | 4/2021 | Aberg | G06F 11/3447 |
| 2014/0129286 A1 | 5/2014 | Allen et al. | |
| 2014/0331277 A1 | 11/2014 | Frascadore et al. | |
| 2015/0378805 A1 | 12/2015 | Nakano et al. | |
| 2016/0300156 A1* | 10/2016 | Bowers | G06F 9/46 |
| 2017/0141945 A1 | 5/2017 | Giammaria et al. | |
| 2017/0147931 A1 | 5/2017 | Desai et al. | |
| 2017/0330058 A1* | 11/2017 | Silberman | G06N 20/00 |
| 2018/0082002 A1* | 3/2018 | Demena | G06F 17/18 |
| 2019/0043070 A1* | 2/2019 | Merrill | G06N 5/04 |

FOREIGN PATENT DOCUMENTS

WO   WO 2017/139046    8/2017

OTHER PUBLICATIONS

Adebayo "FairML: ToolBox for Diagnosing Bias in Predictive Modeling". Masters Thesis, Massachusetts Institute of Technology, 2016.*
Shaikh et al. "An End-to-End Machine Learning Pipeline that Ensures Fairness Policies", Oct. 18, 2017, arXiv:1710.06876v1.*

* cited by examiner

*Primary Examiner* — Daniel T Pellett (57) ABSTRACT

Concepts and technologies disclosed herein are directed to machine learning model understanding as-a-service. According to one aspect of the concepts and technologies disclosed herein, a model understanding as-a-service system can receive, from a user system, a service request that includes a machine learning model created for a user associated with the user system. The model understanding as-a-service system can conduct an analysis of the machine learning model in accordance with the service request. The model understanding as-a-service system can compile, for the user, results of the analysis of the machine learning model in accordance with the service request. The model understanding as-a-service system can create a service response that includes the results of the analysis. The model understanding as-a-service system can provide the service response to the user system.

20 Claims, 4 Drawing Sheets

MACHINE LEARNING MODEL UNDERSTANDING AS-A-SERVICE

BACKGROUND

Machine learning is an area of computer science in which computer systems are able to learn without being explicitly programmed. Machine learning is used in many fields of science and technology from speech recognition to artificial intelligence to advertising, among many others. Current machine learning libraries generate machine learning models that are monolithic and complicate the assessment of model output correlations. Additionally, machine learning models can learn feature biases from data sets, but the feature biases might not be clearly visible to the model creator. These problems manifest by the need to determine a root cause analysis, which is otherwise unavailable, and to determine unknown feature biases realized only after a large number of evaluations (often in deployment) have been executed. Moreover, the need to control the actual data (in terms of features) might be realized for capacity, security, and other aspects, but without exhaustive cross-validation, the importance of certain features is unknown.

SUMMARY

Concepts and technologies disclosed herein are directed to machine learning model understanding as-a-service. According to one aspect of the concepts and technologies disclosed herein, a model understanding as-a-service system can receive, from a user system, a service request that includes a machine learning model created for a user associated with the user system. The model understanding as-a-service system can conduct an analysis of the machine learning model in accordance with the service request. The model understanding as-a-service system can compile, for the user, results of the analysis of the machine learning model in accordance with the service request. The model understanding as-a-service system can create a service response that includes the results of the analysis. The model understanding as-a-service system can provide the service response to the user system.

In some embodiments, the service request instructs the model understanding as-a-service system to determine a feature bias within the machine learning model. In these embodiments the analysis can include determining the feature bias within the machine learning model, and the results of the analysis can include an identification of the feature bias.

In some embodiments, the service request can include a data set be used during the analysis. In some alterative embodiments, the service request can include instructions to instruct the model understanding as-a-service system to create a simulated data set to be used during the analysis.

In some embodiments, the service request can instruct the model understanding as-a-service system to consider a compliance policy for the analysis. The compliance policy can include a user-imposed compliance policy, a government-imposed compliance policy, or a third party-imposed compliance policy.

In some embodiments, the service request can include a scope for the service response. The scope of the service response can be dictated by internal response parameters, including response parameters that define the scope of a default service response acceptable as the service response if the service request does not identify the scope of the expected response. Alternatively, the service response can be customized for service requests associated with a particular user, group of users, or user domain. The service request can explicitly define the scope of the expected response. The scope of the service response can include a root cause analysis for the feature bias. The scope of the service response can include a description of the feature bias.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Concepts and technologies disclosed herein are directed to machine learning model understanding as-a-service. The machine learning model understanding service disclosed herein facilitates the automatic discovery and tracking of biases by certain input features for a specific output (e.g., feature 1 always means output is +1). The machine learning model understanding service can set one or more thresholds for bias detection and can alert users when one or more thresholds are reached or exceeded. The machine learning model understanding service can increase efficiency by reducing the number of features (and samples) required for model evaluation (reduced model size and throughput requirements). The machine learning model understanding service can perform independent evaluation of a machine learning model for bias, while also indicating the potential cost of a bias model, either by a parallel model or second comparison source. The machine learning model understanding service can monitor machine learning models over time to identify bias that manifests as a result of feature drift.

While the subject matter described herein may be presented in the general context of program modules that execute in conjunction with the execution of an operating system and application programs on a computer system, computing device, mobile device, and/or other computing resource, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-processor systems, microprocessor-based or programmable consumer electronics, minicomputers, mainframe computers, and the like.

Figure 1:
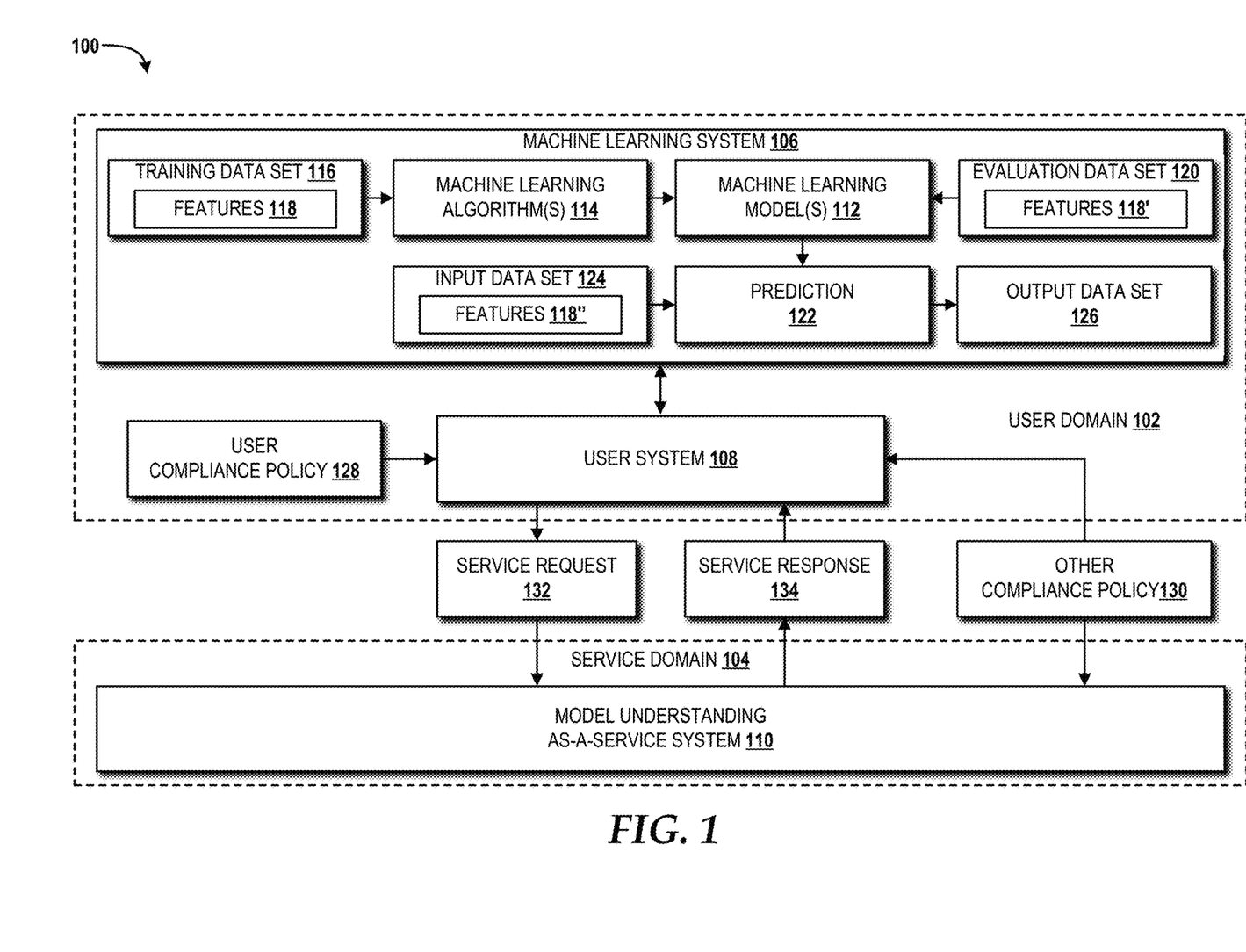
FIG. 1 is a block diagram illustrating aspects of an illustrative operating environment in which embodiments of the concepts and technologies disclosed herein can be implemented.

Referring now to FIG. 1, aspects of an illustrative operating environment 100 in which embodiments of the concepts and technologies disclosed herein can be implemented will be described. The illustrated operating environment 100 includes a user domain 102 and a service domain 104. The user domain 102 includes a machine learning system 106 and a user system 108. The service domain 104 includes a model understanding as-a-service system 110 that can be utilized by one or more users (not shown) associated with the user domain 102 to assess performance of one or more machine learning models 112 created by the machine learning system 106.

The user domain 102 can include any system(s), device(s), network(s), database(s), or any combination thereof associated with one or more users. In the illustrated embodiment, the user domain 102 includes the machine learning system 106 and the user system 108. In some embodiments, the machine learning system 106 is provided as a software system executed, at least in part, by one or more processors of the user system 108. Alternatively, the machine learning system 106 can be external to the user system 108 and can be made accessible either locally (e.g., via a local area network or "LAN") or remotely, whereby the machine learning system 106 operates, for example, off-site, such as in a cloud computing network, a server host, or the like. Moreover, user access to the machine learning system 106 via the user system 108 can be protected via user name, password, PIN, multi-factor authentication, the like, or any combination thereof. The physical location of the machine learning system 106 with respect to the user system 108 is inconsequential to the performance of the concepts and technologies disclosed herein. The machine learning system 106 is shown as being part of the user domain 102, but might, in some embodiments, be part of multiple user domains 102, such as in an embodiment in which the machine learning system 106 is provided as part of a cloud-based service. Moreover, as a cloud-based service, the machine learning system 106 might be implemented as one or more instances instantiated on a cloud computing platform (best shown in FIG. 3) at the request of one or more users of the user domain 102; or alternatively, the machine learning system 106 might be implemented as multiple instances that can be created for multiple users operating in multiple user domains 102. Those skilled in the art will appreciate alternative configurations of the machine learning system 106 and the user system 108. For purposes of concise explanation below, the machine learning system 106 will be described as performing operations exclusively in response to requests from the user system 108 at the sole discretion of one or more users associated with the user domain 102.

Figure 3:
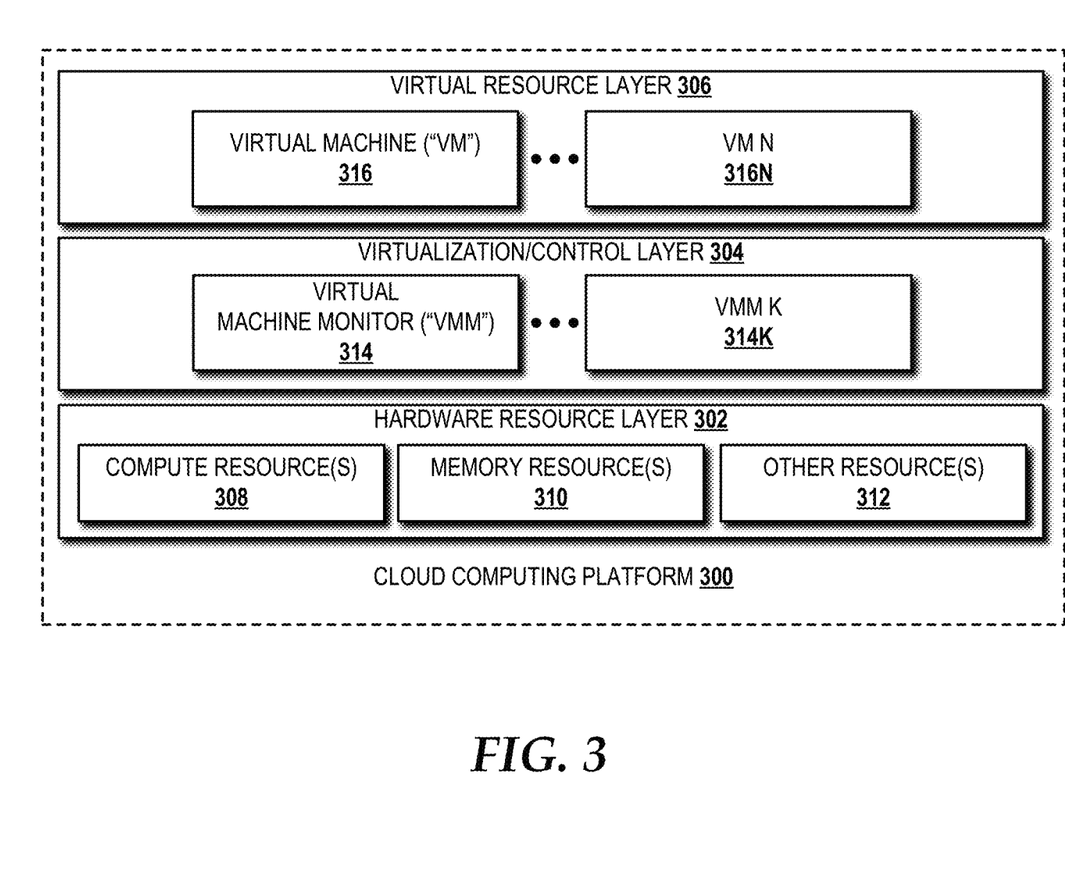
FIG. 3 is a block diagram illustrating a virtualization system capable of implementing aspects of the concepts and technologies disclosed herein.

The service domain 104 can host the model understanding as-a-service system 110 on one or more computer systems (best shown in FIG. 4) and/or on one or more cloud computing platforms (best shown in FIG. 3). In the latter embodiment, the cloud computing platform can provide a plurality of cloud-based services of which the model understanding service defined herein can be part. In these embodiments, the user domain 102 and any associated users can be viewed as a cloud tenant. A cloud-based service can be any service provided in accordance with a cloud computing model that enables ubiquitous, convenient, on-demand network access to a shared pool of configurable computing resources that can be rapidly provisioned and released with minimal management effort or service provider interaction.

The illustrated machine learning system 106 includes the machine learning model(s) 112 (hereinafter referred to in the singular as "machine learning model 112" or in the plural as "machine learning models 112") introduced above. The machine learning model 112 can be created by the machine learning system 106 based upon one or more machine learning algorithms 114 (hereinafter referred to in the singular as "machine learning algorithm 114" or in the plural as "machine learning algorithms 114"). The machine learning algorithm 114 can be any existing, well-known algorithm, any proprietary algorithms, or any future machine learning algorithm. Some example machine learning algorithms 114 include, but are not limited to, gradient descent, linear regression, logistic regression, linear discriminant analysis, classification tree, regression tree, Naive Bayes, K-nearest neighbor, learning vector quantization, support vector machines, and the like. Those skilled in the art will appreciate the applicability of various machine learning algorithms 114 based upon the problem(s) to be solved by machine learning via the machine learning system 106. An example below explores the problem of determining creditworthiness in consideration of mortgage lending practices. This example is provided to illustrate a real-world application of the concepts and technologies disclosed herein and is not intended to be construed as being limiting in any way.

The machine learning system 106 can control the creation of the machine learning models 112 via one or more training parameters. In some embodiments, the training parameters are selected by one or more users associated with the user domain 102. Alternatively, in some embodiments, the training parameters are automatically selected based upon data provided in one or more training data sets 116. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 114 converges to the optimal weights. The machine learning algorithm 114 can update the weights for every data example included in the training data set 116. The size of an update is controlled by the learning rate. A learning rate that is too high might prevent the machine learning algorithm 114 from converging to the optimal weights. A learning rate that is too low might result in the machine learning algorithm 114 requiring multiple training passes to converge to the optimal weights.

The model size is regulated by the number of input features ("features") 118 in the training data set 116. A greater the number of features 118 yields a greater number of possible patterns that can be determined from the training data set 116. The model size should be selected to balance the resources (e.g., compute, memory, storage, etc.) needed for training and the predictive power of the resultant machine learning model 112.

The number of training passes indicates the number of training passes that the machine learning algorithm 114 makes over the training data set 116 during the training process. The number of training passes can be adjusted based, for example, on the size of the training data set 116, with larger training data sets being exposed to fewer training passes in consideration of time and/or resource utilization.

The effectiveness of the resultant machine learning model 112 can be increased by multiple training passes.

Data shuffling is a training parameter designed to prevent the machine learning algorithm 114 from reaching false optimal weights due to the order in which data contained in the training data set 116 is processed. For example, data provided in rows and columns might be analyzed first row, second row, third row, etc., and thus an optimal weight might be obtained well before a full range of data has been considered. By data shuffling, the data contained in the training data set 116 can be analyzed more thoroughly and mitigate bias in the resultant machine learning model 112.

Regularization is a training parameter that helps to prevent the machine learning model 112 from memorizing training data from the training data set 116. In other words, the machine learning model 112 fits the training data set 116, but the predictive performance of the machine learning model 112 is not acceptable. Regularization helps the machine learning system 106 avoid this overfitting/memorization problem by adjusting extreme weight values of the features 118. For example, a feature that has a small weight value relative to the weight values of the other features in the training data set 116 can be adjusted to zero.

The machine learning system 106 can determine model accuracy after training by using one or more evaluation data sets 120 containing the same features 118' as the features 118 in the training data set 116. This also prevents the machine learning model 112 from simply memorizing the data contained in the training data set 116. The number of evaluation passes made by the machine learning system 106 can be regulated by a target model accuracy that, when reached, ends the evaluation process and the machine learning model 112 is considered ready for deployment.

After deployment, the machine learning model 112 can perform prediction 122 with an input data set 124 having the same features 118" as the features 118 in the training data set 116 and the features 118' of the evaluation data set 120. The results of the prediction 122 are included in an output data set 126 consisting of predicted data.

The output data set 126 can reflect one or more feature biases in the machine learning model 112. A feature bias present in the machine learning model 112 causes the prediction 122 to bias weights of certain features in the features 118" of the data contained in the input data set 124. This yields the output data set 126 containing data biased towards these certain features, and based upon the problem to be solved via the machine learning model 112, data biases can result poor overall model performance.

A user of the machine learning system 106 might be a machine learning system designer who selects the machine learning algorithm 114, the training data set 116, one or more training parameters, and/or the evaluation data set 120, and otherwise oversees operation of the machine learning system 106 in application of addressing one or more defined problems. The concepts and technologies disclosed herein facilitate model understanding of machine learning model(s) 112 created by the machine learning system 106 via model understanding provided by the model understanding as-a-service system 110. Model understanding can help a user identify deficiencies in the machine learning model 112 that can lead to feature bias(es), and can help the user make intelligent changes to the machine learning model 112 to reduce or eliminate one or more feature biases.

In some instances, a problem to be solved by the machine learning system 106 can be regulated by one or more compliance policies, such as one or more user compliance policies 128 defined by one or more users in the user domain 102 and/or one or more other compliance policies 130 (e.g., government compliance policy, regulatory agency policy, and/or other third party compliance policy). A compliance policy, whether a user compliance policy 128 or another compliance policy 130, can ensure that one or more compliance assertions are considered by the machine learning model(s) 112 created by the machine learning system 106. A compliance assertion can be used by the machine learning system 106 during training of the machine learning model(s) 112 to ensure the machine learning model(s) 112 avoid certain biases. For example, a compliance policy can define compliance assertions to avoid racial or class bias, and/or other concerns to be asserted against the machine learning model(s) 112.

The user system 108 can create a service request 132 directed to the model understanding as-a-service system 110. The service request 132 contains all information that the model understanding service needs to perform an analysis to identify any feature bias exhibited by the machine learning model 112. In some embodiments, the service request 132 includes the machine learning model(s) 112 to be analyzed and a data set for testing. The data set can be the evaluation data set 120, the input data set 124, another data set, or a simulated data set created by the user system 108 based upon the features 118 targeted by the machine learning model(s) 112. Alternatively, the service request 132 can instruct the model understanding as-a-service system 110 to create a simulated data set based upon the features 118. The model understanding as-a-service system 110 can perform the analysis to identify any feature bias exhibited by the machine learning model 112 and respond to the service request 132 with a service response 134. The scope of the service response 134 can be dictated by internal response parameters, including response parameters that define the scope of a default service response acceptable as the service response 134 if the service request 132 does not identify the scope of the expected response. Alternatively, the service response 134 can be customized for service requests 132 associated with a particular user, group of users, or user domain (e.g., the user domain 102). The service request 132 can explicitly define the scope of the expected response.

The scope of the service response 134 can include a simple indication of bias/non-bias for one or more of the features 118, a text-based description of results of the analysis (e.g., "this is biased/unbiased" or "this is the most/least accurate"), a visualization such as a graph or chart for the feature bias, a root cause analysis of the feature bias, one or more suggestions for changes to be implemented by the machine learning system 106 to the machine learning model(s) 112 in an effort to overcome, at least in part, the identified feature bias(es) through model tuning. For example, by selectively eliminating, perturbing, or otherwise warping the features 118 deliberately, effects on the output can be observed. For example, if the machine learning model 112 was created to predict creditworthiness, the model understanding service can input features like income, location, gender, etc. to determine their effect on the output and identify, in the service response 134, one or more of these input features that can be eliminated from consideration by the machine learning system 106 to effectively tune the machine learning model 112 to avoid certain demographic biases.

Alternatively, a parallel model with a fixed structure (e.g. a deep neural network) can be learned with the exact input features and model output features. With the parallel model, the model understanding service can inspect the activation energy of a specific feature to additionally correlate importance of that feature. Specifically, a sister model can be created by the model understanding as-a-service system 110 using either the training data set 116, the evaluation data set 120, the input data set 124, or a simulated data set. Afterwards, the weights of certain models (e.g., deep neural networks or support vector machines) can be inspected by a system, such as the user system 108, to determine the importance of a particular sample, a particular feature or combination of features in one or more of the aforementioned data sets. While the concepts and technologies disclosed herein do not deeply explore the reverse-engineering of a model framework, insights can be discovered from a parallel model and these insights can be presented, by the user system 108 to one or more users and/or one or more model developers who can use the insights to better understand the impact of a set of features or samples.

The service response 134 also can help a user (e.g., a machine learning model developer) understand the deeper insights of the machine learning model(s) 112 created by the machine learning system 106 under their management. Specifically, the model understanding service can help determine the importance and the tolerance of a specific input feature that keeps the same output feature. The user system 108 can create, based upon the service response 134, one or more visualizations (e.g., graphs, charts, spreadsheets, and/or the like) and can present the visualization(s) to the user. Alternatively or additionally, the user system 108 can create, based upon the service response 134, one or more statistical comparisons of model performance by comparing one or more different machine learning models 112 with variants of the features 118 and samples selected from the output data set 126 that are produced and discovered by the model understanding as-a-service system 108. For example, if the machine learning models 112 trained on a slightly varying dataset for a year showed different output characteristics, but the removal of one or more of the features 118 had no impact on those characteristics, a conclusion can be made that either other overwhelming feature conditions exist or that the feature(s) 118 removed function to offset or "cancel each other out" in terms of output effects. Through this exploration and discovery process, the model understanding service can learn to prune unnecessary input features based on their influence on the model output (e.g., the output data set 126 for a given input data set 124). Moreover, beyond singular feature importance, the model understanding service can help to map outputs from machine learning models 112 back to traditional external data (e.g., demographics) by selecting only the most important feature sets—even if there multiple features are deemed important. For example, selecting only "approval" outputs could allow the machine learning model(s) 112 to find positively correlated features, which can then be mapped to external datasets.

Current state-of-the-art methods for determining feature bias in machine learning models operate strictly by the addition of noise or the removal of considered features and the construction of a parallel model. These parallel models are often linear in nature so that model developers can compare the decision functions (e.g., hyperplanes) for similarity. For example, if features are removed from an initial training data set, and the resultant linear decision boundary is still proximal (i.e., in terms of Euclidean, linear, or non-linear distances) to previously identified samples, the model developer can determine that those features had little or no importance in the model. This solution has several shortcomings as the model becomes (a) more complex with additional features and/or large datasets, (b) incapable of being described by simple linear decision boundaries, or (c) the need to map observations about features to specific data instances. Complexity in feature count immediately leads to longer computation times and exhaustive analysis of a more complex feature space. Very large datasets might initially require very large machine learning models to obtain reasonable prediction performance. While existing methods can be adapted to also be trained exhaustively in big-data environments, additional delays and computational requests become the burden of the system (or model developer) at every step in the process. The model understanding as-a-service system 110 can avoid both pitfalls by (a) directly evaluating slight perturbations of the features 118 and by observing the effects on output or (b) utilizing parallel models (or ensembles of parallel models) that are targeted at the area of concern, as specified by compliance policies, such as the user compliance policy 128 and/or the other compliance policy 130. Finally, mapping observations with visualizations and/or statistical readouts to specific data instances is a tedious task. With the capability of the model understanding as-a-service system 110 to use both feature perturbation and parallel model evaluation, this task can be gradually iterated upon for insights across any large domain of features.

Users of the model understanding as-a-service system 110 can modulate their model approach in a number of ways. For example, if the service response 134 indicates that only a certain set of features are introducing a bias that violates a compliance request dictated by one of the user compliance policy 128 or the other compliance policy 130, a user can immediately eliminate or reduce impact by manually downweighting the features, additional regularization, or feature projection (e.g. LDA, dimensionality reduction, etc.). If, instead, the user wants to understand the impact of a detected bias on the machine learning model 112, the model understanding as-a-service system 110 can offer comparisons of an internally-trained parallel model versus that of the machine learning model provided in the service request 132, and can offer to demonstrate any potential performance loss. For example, the user might understand that a bias is detected, but after seeing the model performance loss incurred by dropping the offending features, he or she can apply a different strategy, like validation (e.g., via the addition of a secondary model to post-correct bias conditions) or another rule-based strategy based on the input features. Finally, the user might also use insights from the service response 134 to derive her or his own "error dataset," which can contain explicit bias producing samples or features. This "error dataset" can be utilized to spot troublesome outputs, as a validation service, and/or as a final check against future model versions that can be tested before release into production.

Figure 2:
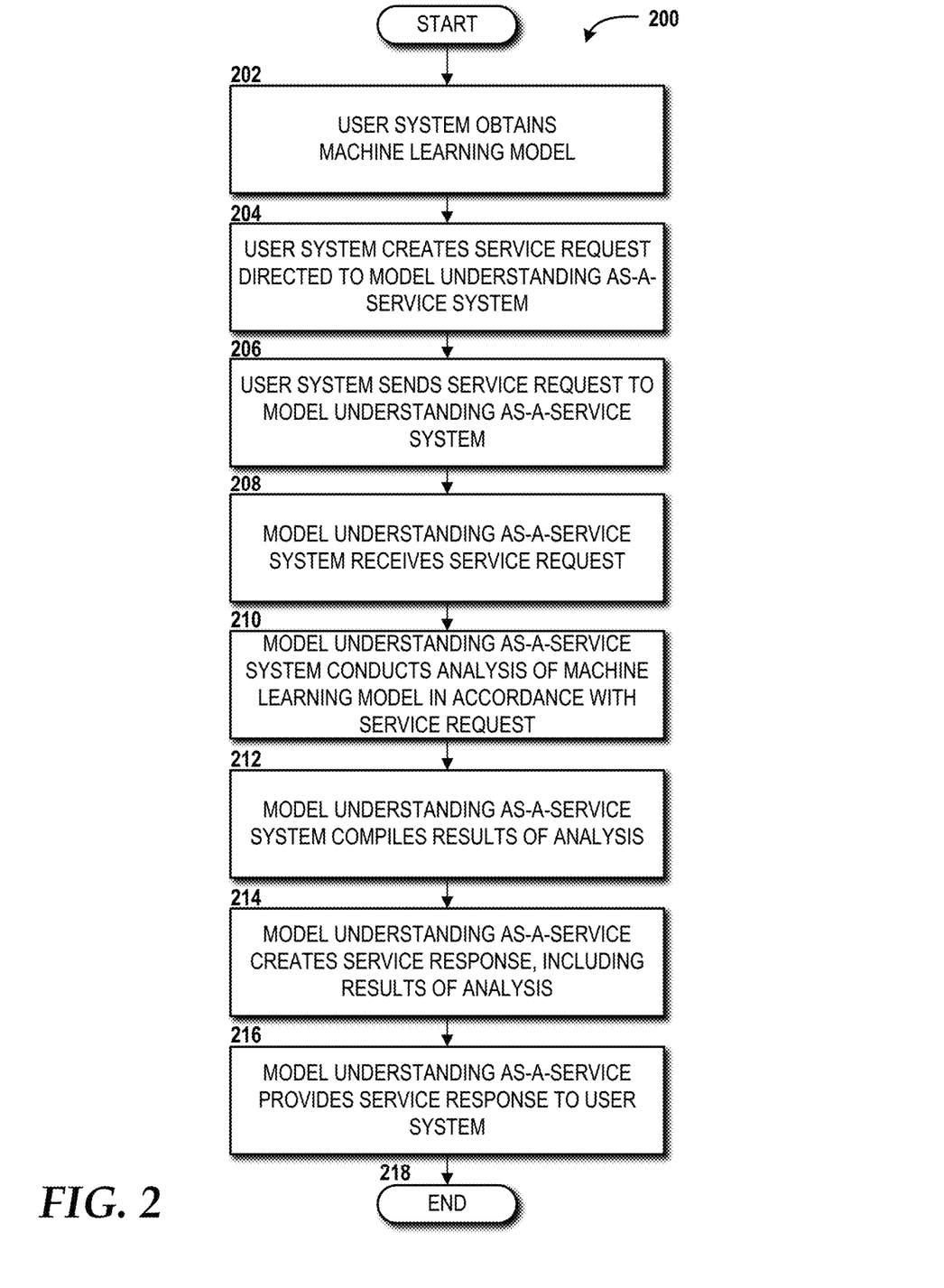
FIG. 2 is a flow diagram illustrating aspects of a method for providing machine learning model understanding as-a-service, according to an illustrative embodiment.

Turning now to FIG. 2, aspects of a method 200 for machine learning model understanding as-a-service will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof are used to refer to causing one or more processors (best shown in FIGS. 3 and 4) of the user system 108 or the model understanding as-a-service system 110 to perform operations.

For purposes of illustrating and describing some of the concepts of the present disclosure, the methods disclosed herein are described as being performed, at least in part, by of the user system 108 or the model understanding as-a-service system 110 executing instructions for implementing the concepts and technologies disclosed herein. It should be understood that additional and/or alternative systems, devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins at operation 202, where the user system 108 obtains the machine learning model 112 to be analyzed for model understanding. In some embodiments, the user system 108 obtains the machine learning model 112 from the machine learning system 106 as described herein above with reference to FIG. 1. It is contemplated that the user system 108 can obtain the machine learning model 112 from another source, such as a source outside of the user domain 102.

From operation 202, the method 200 proceeds to operation 204, where the user system 108 creates the service request 132 directed to the model understanding as-a-service system 110 operating in the service domain 104. From operation 204, the method 200 proceeds to operation 206, where the user system 108 sends the service request 132 to the model understanding as-a-service system 110. The service request 132 contains all information that the model understanding as-a-service system 110 needs to perform an analysis to identify any feature bias exhibited by the machine learning model 112. In this embodiment, the service request 132 includes the machine learning model 112 to be analyzed and a data set for testing. The data set can be the evaluation data set 120, the input data set 124, another data set, or a simulated data set created by the user system 108 based upon the features 118 targeted by the machine learning model(s) 112. Alternatively, the service request 132 can instruct the model understanding as-a-service system 110 to create a simulated data set based upon the features 118.

From operation 206, the method 200 proceeds to operation 208, where the model understanding as-a-service system 110 receives the service request 132. From operation 208, the method 200 proceeds to operation 210, where the model understanding as-a-service system 110 conducts an analysis of the machine learning model 112 in accordance with the service request 132. In particular, the model understanding as-a-service system 110 can perform the analysis to identify any feature bias exhibited by the machine learning model 112. From operation 210, the method 200 proceeds to operation 212, where the model understanding as-a-service system 110 compiles results of the analysis, including any feature bias(es) and results responsive to details of the service request 132.

From operation 212, the method 200 proceeds to operation 214, where the model understanding as-a-service system 110 creates the service response 134, including the results of the analysis. The scope of the service response 134 can be dictated by internal response parameters, including response parameters that define the scope of a default service response acceptable as the service response 134 if the service request 132 does not identify the scope of the expected response. Alternatively, the service response 134 can be customized for service requests 132 associated with a particular user, group of users, or user domain (e.g., the user domain 102). The service request 132 can explicitly define the scope of the expected response.

The scope of the service response 134 can include a simple indication of bias/non-bias for one or more of the features 118, a text-based description of results of the analysis (e.g., "this is bias/unbiased" or "this is the most/least accurate"), a visualization such as a graph or chart for the feature bias, a root cause analysis of the feature bias, one or more suggestions for changes to be implemented by the machine learning system 106 to the machine learning model(s) 112 in an effort to overcome, at least in part, the identified feature bias(es) through model tuning. The service response 134 also can help a user (e.g., a machine learning model developer) understand the deeper insights of the machine learning model(s) 112 created by the machine learning system 106 under their management. Specifically, the model understanding service can help determine the importance and the tolerance of a specific input feature that keeps the same output feature. Through this exploration and discovery process, the model understanding service can learn to prune unnecessary input features based on their influence on the model output (e.g., the output data set 126 for a given input data set 124). Moreover, beyond singular feature importance, the model understanding service can help to map outputs from machine learning models 112 back to traditional external data (e.g., demographics) by selecting only the most important feature sets—even if there multiple features are deemed important. For example, selecting only "approval" outputs could allow the machine learning model(s) 112 to find positively correlated features, which can then be mapped to external datasets.

From operation 214, the method 200 proceeds to operation 216, where the model understanding as-a-service system 110 provides the service response 134 to the user system 108, which can present the results of the analysis to one or more users. From operation 216, the method 200 proceeds to operation 218, where the method 200 ends.

As mentioned above, those skilled in the art will appreciate the applicability of various machine learning algorithms 114 based upon the problem(s) to be solved by machine learning via the machine learning system 106. The example immediately below explores the problem of determining creditworthiness in consideration of mortgage lending practices. This example is provided to illustrate a real-world application of the concepts and technologies disclosed herein embodied, at least in part, in FIGS. 1 and 2 and the descriptions thereof, and is not intended to be construed as being limiting in any way.

In this example, the user domain 102 is associated with a home mortgage company. The home mortgage company is faced with numerous mortgage applications, perhaps on a daily basis, and therefore a problem exists where the mortgage company cannot efficiently evaluate all incoming applications. One primary factor in approving a given applicant for a mortgage is credit worthiness based on the applicant's credit history as kept by one or more credit bureaus. It is possible that a large number of applicants will not be approved based solely upon credit worthiness, but the resources required to run a traditional credit check reduces overall efficiency of the mortgage lending process. For this reason, the mortgage company might consider machine learning to predict credit worthiness. Thus, in this example, the machine learning model 112 created by the machine learning system 106 is used to predict the credit worthiness of applicants for mortgages with the home mortgage company.

The home mortgage company, via the user system 108, can send the machine learning model 112 for predicting credit worthiness to the model understanding as-a-service system 110 to be analyzed for any potential feature bias, which, in this context, can include, for example, feature biases based upon demographics of the mortgage applicants. Moreover, the model understanding as-a-service system 110 can validate compliance with one or more compliance policies, such as the user compliance policy 128 that captures compliance assertions made by the home mortgage company as well as the other compliance policy 130 that captures compliance assertions made by a regulatory body like the United States government via the Code of Federal Regulations on home mortgages. The user system 108 also can provide a data set or request that a data set be simulated for use as input during the analysis.

The model understanding as-a-service system 110 can observe and build correlations to detect features biases. In some embodiments, the model understanding as-a-service system 110 can build and update a parallel model with its output used as training for the machine learning model 112 under analysis. In some embodiments, the model understanding as-a-service system 110 can distort input and correlate output after distortion to identify and verify feature bias. In some embodiments, the model understanding as-a-service system 110 can suppress certain input and correlate output after suppression to identify and verify feature bias. In some embodiments, the model understanding as-a-service system 110 can weight certain features 118 (i.e., perturbing) to measure the feature importance. In these embodiments, local interpretable model-agnostic explanations or "LIME" open source technologies can be utilized to measure feature importance.

In response to finding a strong correlation between one or more features and output, the model understanding as-a-service system 110 can send notification of the strong correlation (e.g., in the service response 134) to the user system 108 for consideration by one or more human operators (users). In addition or alternatively, the model understanding as-a-service system 110 can send notification of the strong correlation to a regulatory body and/or other third party. In some embodiments, the service response 134 can include measurements of the frequency and importance (e.g., how much of the incoming data fits this type of correlation/distortion). In some embodiments, the service response 134 can include one or more suggestions for change in which the model understanding as-a-service system 110 advocates that the machine learning model 112 be updated/tuned in a specific manner.

After receiving the service response 134, the home mortgage company can evaluate any changes, including conducting a loss analysis to identify any potential loss when updating the machine learning model 112 in accordance with some or all of the changes suggested by the model understanding as-a-service system 110. The home mortgage company can decide whether to retrain the machine learning model 112, ignore the suggestions, or adapt for inputs, possibly using simulated input suggestions from the model understanding service to avoid bias from a new machine learning model.

Turning now to FIG. 3, a cloud computing platform 300 capable of implementing aspects of the concepts and technologies disclosed herein, according to an illustrative embodiment. In some embodiments, the machine learning system 106, the user system 108, and/or the model understanding as-a-service system 110 can be implemented on at least a portion of the cloud computing platform 300.

The illustrated cloud computing platform 300 includes a hardware resource layer 302, a virtualization/control layer 304, and a virtual resource layer 306 that work together to perform operations as will be described in detail herein. While connections are shown between some of the components illustrated in FIG. 3, it should be understood that some, none, or all of the components illustrated in FIG. 3 can be configured to interact with one other to carry out various functions described herein. In some embodiments, the components are arranged so as to communicate via one or more networks (best shown in FIG. 4). Thus, it should be understood that FIG. 3 and the following description are intended to provide a general understanding of a suitable environment in which various aspects of embodiments can be implemented, and should not be construed as being limiting in any way.

The hardware resources layer 302 provides hardware resources, which, in the illustrated embodiment, include one or more compute resources 308, one or more memory resources 310, and one or more other resources 312. The compute resource(s) 308 can include one or more hardware components that perform computations to process data, and/or to execute computer-executable instructions of one or more application programs, operating systems, and/or other software. The compute resources 308 can include one or more central processing units ("CPUs") configured with one or more processing cores. The compute resources 308 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 308 can include one or more discrete GPUs. In some other embodiments, the compute resources 308 can include CPU and GPU components that are configured in accordance with a co-processing CPU/GPU computing model, wherein the sequential part of an application executes on the CPU and the computationally-intensive part is accelerated by the GPU. The compute resources 308 can include one or more system-on-chip ("SoC") components along with one or more other components, including, for example, one or more of the memory resources 310, and/or one or more of the other resources 312. In some embodiments, the compute resources 308 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more Open Multimedia Application Platform ("OMAP") SoCs, available from TEXAS INSTRUMENTS of Dallas, Texas; one or more customized versions of any of the above SoCs; and/or one or more proprietary SoCs. The compute resources 308 can be or can include one or more hardware components architected in accordance with an ARM architecture, available for license from ARM HOLDINGS of Cambridge, United Kingdom. Alternatively, the compute resources 308 can be or can include one or more hardware components architected in accordance with an x86 architecture, such an architecture available from INTEL CORPORATION of Mountain View, California, and others. Those skilled in the art will appreciate the implementation of the compute resources 308 can utilize various computation architectures, and as such, the compute resources 308 should not be construed as being limited to any particular computation architecture or combination of computation architectures, including those explicitly disclosed herein.

The memory resource(s) 310 can include one or more hardware components that perform storage operations, including temporary or permanent storage operations. In some embodiments, the memory resource(s) 310 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 308.

The other resource(s) 312 can include any other hardware resources that can be utilized by the compute resources(s) 308 and/or the memory resource(s) 310 to perform operations described herein. The other resource(s) 312 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 302 can be virtualized by one or more virtual machine monitors ("VMMs") 314A-314K (also known as "hypervisors"; hereinafter "VMMs 314") operating within the virtualization/control layer 304 to manage one or more virtual resources that reside in the virtual resource layer 306. The VMMs 314 can be or can include software, firmware, and/or hardware that alone or in combination with other software, firmware, and/or hardware, manages one or more virtual resources operating within the virtual resource layer 306.

The virtual resources operating within the virtual resource layer 306 can include abstractions of at least a portion of the compute resources 308, the memory resources 310, the other resources 312, or any combination thereof. These abstractions are referred to herein as virtual machines ("VMs"). In the illustrated embodiment, the virtual resource layer 306 includes VMs 316A-316N (hereinafter "VMs 316"). In some embodiments, one or more of the VMs 316 can execute, at least in part, the machine learning system 106, the user system 108, and/or the model understanding as-a-service system 110.

Figure 4:
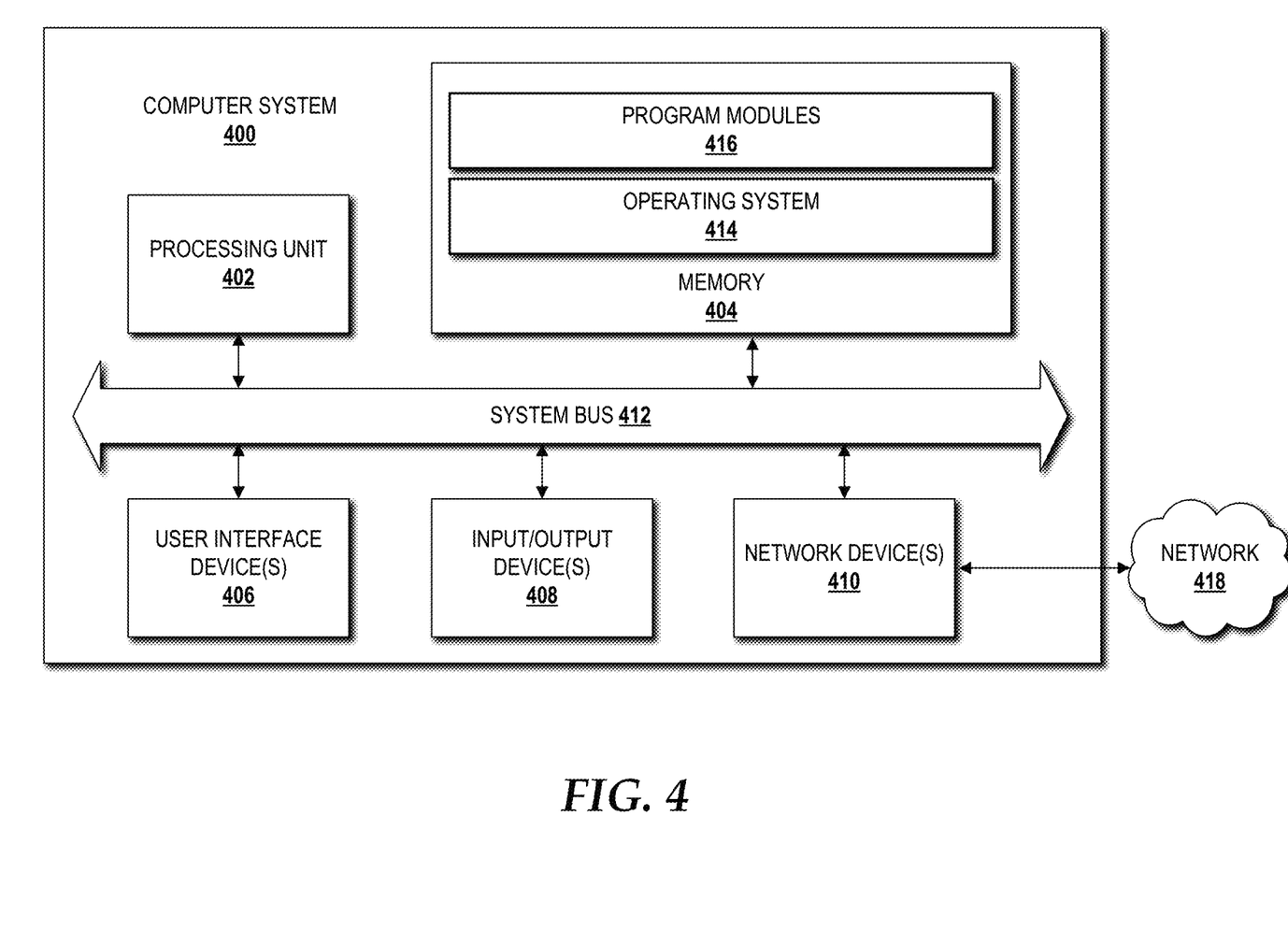
FIG. 4 is a block diagram illustrating an example computer system capable of implementing aspects of the embodiments presented herein.

FIG. 4 is a block diagram illustrating a computer system 400 configured to provide the functionality in accordance with various embodiments of the concepts and technologies disclosed herein. It should be understood, however, that modification to the architecture may be made to facilitate certain interactions among elements described herein. In some embodiments, the machine learning system 106, the user system 108, and/or the model understanding as-a-service system 110 can be configured the same as or configured to the computer system 400.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. The program modules 416 and/or other programs can be embodied in computer-readable media containing instructions that, when executed by the processing unit 402, perform various operations such as those described herein. According to embodiments, the program modules 416 may be embodied in hardware, software, firmware, or any combination thereof.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via a network 418. Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 418 may be a wired network such as, but not limited to, a Wide Area Network ("WAN"), a wired Personal Area Network ("PAN"), or a wired Metropolitan Area Network ("MAN"). The network 418 can include one or more networks operating within the user domain 102 or the service domain 104, and/or one or more networks that facilitate communications between any of the components shown in FIG. 1 (e.g., intra-domain between the machine learning system 106 and the user system 108, or inter-domain between the user system 108 and the model understanding as-a-service system 110).

Based on the foregoing, it should be appreciated that aspects of machine learning model understanding as-a-service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A model understanding as-a-service system comprising:
    a processor; and
    a memory having instructions stored thereon that, when executed by the processor, cause the processor to perform operations, the operations comprising
        receiving, from a user system, a service request comprising a machine learning model, wherein the service request instructs the model understanding as-a-service system to conduct an analysis of the machine learning model to identify a feature bias exhibited by the machine learning model, wherein the service request further instructs the model understanding as-a-service system to apply a compliance policy for the analysis, and wherein the compliance policy comprises a user-imposed compliance policy,
        conducting the analysis of the machine learning model in accordance with the service request to identify the feature bias exhibited by the machine learning model, wherein conducting the analysis comprises
            determining a plurality of perturbations of a plurality of features of the machine learning model,
            applying the plurality of perturbations of the plurality of features of the machine learning model for a plurality of samples,
            executing, on the model understanding as-a-service system, the machine learning model over the plurality of samples as inputs to obtain a plurality of outputs, wherein an effect that each perturbation of the plurality of perturbations has on an output of the machine learning model is based upon a correlation of the plurality of outputs, and
            identifying the feature bias based upon the effect that each perturbation of the plurality of perturbations has on the output of the machine learning model,
        training a second machine learning model with a first training data set, wherein the first training data set is created by removing from a second training data set at least one feature of the plurality of features that is associated with the feature bias, wherein the second training data set was used to train the machine learning model;
        computing a performance loss of the machine learning model based upon a difference between a first accuracy of the machine learning model as compared to a second accuracy of the second machine learning model;

compiling results of the analysis of the machine learning model in accordance with the service request, wherein the results of the analysis identify the feature bias and the performance loss that is computed, creating a service response comprising the results of the analysis, and providing the service response to the user system.

2. The model understanding as-a-service system of claim 1, wherein the service request further comprises a data set to be used during the analysis.

3. The model understanding as-a-service system of claim 1, wherein the service request further instructs the model understanding as-a-service system to create a simulated data set to be used during the analysis.

4. The model understanding as-a-service system of claim 1, wherein the compliance policy further comprises a government-imposed compliance policy, or a third party-imposed compliance policy.

5. The model understanding as-a-service system of claim 1, wherein the service request further comprises a scope for the service response.

6. The model understanding as-a-service system of claim 5, wherein the scope comprises a root cause analysis for the feature bias.

7. The model understanding as-a-service system of claim 5, wherein the scope comprises a text-based description of the feature bias.

8. The model understanding as-a-service system of claim 1, wherein the service response comprises an indication of a bias or a non-bias for at least one feature of the plurality of features of the machine learning model.

9. The model understanding as-a-service system of claim 1, wherein the service response comprises a root cause analysis of the feature bias.

10. A method comprising:

receiving, by a model understanding as-a-service system, from a user system, a service request comprising a machine learning model, wherein the service request instructs the model understanding as-a-service system to conduct an analysis of the machine learning model to identify a feature bias exhibited by the machine learning model, wherein the service request further instructs the model understanding as-a-service system to apply a compliance policy for the analysis, and wherein the compliance policy comprises a user-imposed compliance policy;

conducting, by the model understanding as-a-service system, the analysis of the machine learning model in accordance with the service request to identify the feature bias exhibited by the machine learning model, wherein conducting the analysis comprises determining a plurality of perturbations of a plurality of features of the machine learning model, applying the plurality of perturbations of the plurality of features of the machine learning model for a plurality of samples, executing, on the model understanding as-a-service system, the machine learning model over the plurality of samples as inputs to obtain a plurality of outputs, wherein an effect that each perturbation of the plurality of perturbations has on an output of the machine learning model is based upon a correlation of the plurality of outputs, and identifying the feature bias based upon the effect that each perturbation of the plurality of perturbations has on the output of the machine learning model, training, by the model understanding as-a-service system, a second machine learning model with a first training data set, wherein the first training data set is created by removing from a second training data set at least one feature of the plurality of features that is associated with the feature bias, wherein the second training data set was used to train the machine learning model;

computing, by the model understanding as-a-service system, a performance loss of the machine learning model based upon a difference between a first accuracy of the machine learning model as compared to a second accuracy of the second machine learning model;

compiling, by the model understanding as-a-service system, results of the analysis of the machine learning model in accordance with the service request, wherein the results of the analysis identify the feature bias and the performance loss that is computed;

creating, by the model understanding as-a-service system, a service response comprising the results of the analysis; and providing, by the model understanding as-a-service system, the service response to the user system.

11. The method of claim 10, wherein the service request further comprises a data set to be used during the analysis.

12. The method of claim 10, wherein the service request further instructs the model understanding as-a-service system to create a simulated data set to be used during the analysis.

13. The method of claim 10, wherein the compliance policy further comprises a government-imposed compliance policy, or a third party-imposed compliance policy.

14. The method of claim 10, wherein the service request further comprises a scope for the service response.

15. The method of claim 14, wherein the scope comprises a root cause analysis for the feature bias.

16. The method of claim 14, wherein the scope comprises a text-based description of the feature bias.

17. The method of claim 10, wherein the service response comprises an indication of a bias or a non-bias for at least one feature of the plurality of features of the machine learning model.

18. A computer storage medium having computer-executable instructions stored thereon that, when executed by a processor of a model understanding as-a-service system, cause the processor to perform operations, the operations comprising:

receiving, from a user system, a service request comprising a machine learning model, wherein the service request instructs the model understanding as-a-service system to conduct an analysis of the machine learning model to identify a feature bias exhibited by the machine learning model, wherein the service request further instructs the model understanding as-a-service system to apply a compliance policy for the analysis, and wherein the compliance policy comprises a user-imposed compliance policy;

conducting the analysis of the machine learning model in accordance with the service request to identify the feature bias exhibited by the machine learning model, wherein conducting the analysis comprises determining a plurality of perturbations of a plurality of features of the machine learning model, applying the plurality of perturbations of the plurality of features of the machine learning model for a plurality of samples, executing, on the model understanding as-a-service system, the machine learning model over the plurality of samples as inputs to obtain a plurality of outputs, wherein an effect that each perturbation of the plurality of perturbations has on an output of the machine learning model is based upon a correlation of the plurality of outputs, and identifying the feature bias based upon the effect that each perturbation of the plurality of perturbations has on the output of the machine learning model;

training a second machine learning model with a first training data set, wherein the first training data set is created by removing from a second training data set at least one feature of the plurality of features that is associated with the feature bias, wherein the second training data set was used to train the machine learning model;

computing a performance loss of the machine learning model based upon a difference between a first accuracy of the machine learning model as compared to a second accuracy of the second machine learning model;

compiling results of the analysis of the machine learning model in accordance with the service request, wherein the results of the analysis identify the feature bias and the performance loss that is computed;

creating a service response comprising the results of the analysis; and providing the service response to the user system.

19. The computer storage medium of claim 18, wherein the service request further comprises a data set to be used during the analysis or instructions to instruct the model understanding as-a-service system to create a simulated data set to be used during the analysis.

20. The computer storage medium of claim 18, wherein the compliance policy further comprises a government-imposed compliance policy, or a third party-imposed compliance policy.

* * * * *